United States Patent
Wang et al.

(10) Patent No.: US 10,916,209 B2
(45) Date of Patent: Feb. 9, 2021

(54) COMPENSATION DEVICE, DISPLAY DEVICE AND METHOD FOR COMPENSATING COMMON ELECTRODE VOLTAGE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jianjun Wang, Beijing (CN); Long Yan, Beijing (CN); Chunyang Nie, Beijing (CN); Ke Dai, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 262 days.

(21) Appl. No.: 15/767,391

(22) PCT Filed: Jul. 24, 2017

(86) PCT No.: PCT/CN2017/094068
§ 371 (c)(1),
(2) Date: Apr. 11, 2018

(87) PCT Pub. No.: WO2018/045837
PCT Pub. Date: Mar. 15, 2018

(65) Prior Publication Data
US 2018/0286336 A1 Oct. 4, 2018
US 2020/0066221 A9 Feb. 27, 2020

(30) Foreign Application Priority Data
Sep. 9, 2016 (CN) .......................... 2016 1 0812444

(51) Int. Cl.
*G09G 3/36* (2006.01)
*G02F 1/1343* (2006.01)
(Continued)

(52) U.S. Cl.
CPC ......... *G09G 3/3648* (2013.01); *G02F 1/1343* (2013.01); *G02F 1/1362* (2013.01);
(Continued)

(58) Field of Classification Search
None
See application file for complete search history.

(56) References Cited

U.S. PATENT DOCUMENTS 8,022,916 B2 * 9/2011 Lee ...................... G09G 3/3655
345/211
8,773,339 B2 * 7/2014 Kim ...................... G09G 3/3655
345/87
(Continued)

FOREIGN PATENT DOCUMENTS

CN 101334680 A 12/2008
CN 201430571 Y 3/2010
(Continued)

OTHER PUBLICATIONS

China Second Office Action, Application No. 201610812444.4, dated Dec. 18, 2018, 23 pps.: with English translation.
(Continued)

*Primary Examiner* — Duane N Taylor, Jr.
(74) *Attorney, Agent, or Firm* — Armstrong Teasdale LLP

(57) ABSTRACT

A compensation device, a display device and a method for compensating common electrode voltage are provided in the embodiments of the present disclosure. A compensation device for a display panel according to an embodiment includes a compensation circuit, a comparison circuit, and an adjustment circuit. The compensation circuit generates a
(Continued)

common electrode compensation signal to be provided to the display panel based on a common electrode input signal for providing a common electrode voltage to the display panel and a common electrode feedback signal from the display panel. The comparison circuit compares the common electrode compensation signal with the common electrode feedback signal. The adjustment circuit adjusts the common electrode compensation signal according to the comparison result of the comparison circuit.

20 Claims, 7 Drawing Sheets

(51) Int. Cl.
 *G02F 1/1362* (2006.01)
 *G02F 1/1345* (2006.01)
(52) U.S. Cl.
 CPC ......... *G09G 3/3655* (2013.01); *G09G 3/3696* (2013.01); *G02F 1/1345* (2013.01); *G02F 2201/121* (2013.01); *G09G 2320/02* (2013.01); *G09G 2320/0693* (2013.01); *G09G 2330/12* (2013.01); *G09G 2360/16* (2013.01)

(56) References Cited

U.S. PATENT DOCUMENTS

2007/0002005 A1\* 1/2007 Kim ................... G09G 3/3666
 345/103
2012/0162184 A1\* 6/2012 Kim ................... G09G 3/3655
 345/212

FOREIGN PATENT DOCUMENTS

| CN | 101750774 A | 6/2010 |
| CN | 102265327 A | 11/2011 |
| CN | 102842295 A | 12/2012 |
| CN | 102903344 A1 | 1/2013 |
| CN | 104050942 A | 9/2014 |
| CN | 106297709 A | 1/2017 |

OTHER PUBLICATIONS

English Translation of PCT International Search Report, Application No. PCT/CN2017/094068, dated Oct. 20, 2017, 2 pages.
PCT Written Opinion, Application No. PCT/CN2017/094068, dated Oct. 20, 2017, 7 pages.: with English translation of relevant part.
First Chinese Office Action, Application No. 201610812444.4, dated Apr. 28, 2018, 29 pps.: with English translation.

\* cited by examiner

COMPENSATION DEVICE, DISPLAY DEVICE AND METHOD FOR COMPENSATING COMMON ELECTRODE VOLTAGE

CROSS REFERENCE TO RELATED APPLICATIONS

This patent application is a National Stage Entry of PCT/CN2017/094068 filed on Jul. 24, 2017, which claims the benefit and priority of Chinese Patent Application No. 201610812444.4 filed on Sep. 9, 2016, the disclosures of which are incorporated herein by reference in their entirety as part of the present application.

BACKGROUND

The present disclosure relates to display technology field, and more particularly, to a display panel, a manufacturing method thereof, a compensation device, a display device, and a method for compensating common electrode voltage (VCOM).

Liquid crystal displays (LCDs) have the advantages of low radiation, small size and low energy consumption, and are widely used in electronic products such as notebook computers, flat-screen TVs, or mobile phones. In a thin film transistor liquid crystal display (TFT-LCD), a gate switching circuit is provided for each pixel, so that each pixel can be relatively independently controlled. Common electrode voltage (VCOM) provides a common voltage for a pixel capacitance (Clc) and a storage capacitance (Cs) of each pixel, so as to provide a reference voltage for a substrate of the liquid crystal display.

BRIEF DESCRIPTION

The embodiments of the present disclosure provide a compensation device, a display device, and a method for compensating common electrode voltage (VCOM).

A first aspect of the present disclosure provides a compensation device for a display panel, including a compensation circuit configured to generate a common electrode compensation signal to be provided to the display panel, based on a common electrode input signal for providing a common electrode voltage to the display panel and a common electrode feedback signal from the display panel, a comparison circuit configured to compare the common electrode compensation signal with the common electrode feedback signal, and an adjustment circuit configured to adjust the common electrode compensation signal according to the comparison result of the comparison circuit.

In an embodiment of the present disclosure, the compensation circuit may include a first capacitor, a first resistor, a second resistor, an amplifier, and a second capacitor. A first terminal of the first capacitor is provided with the common electrode feedback signal, and a second terminal of the first capacitor is coupled to the first resistor. A first terminal of the first resistor is coupled to the second terminal of the first capacitor, and a second terminal of the first resistor is coupled to a first input terminal of the amplifier. A first terminal of the second resistor is coupled to the first input terminal of the amplifier, and a second terminal of the second resistor is coupled to an output terminal of the amplifier. The first input terminal of the amplifier is coupled to the second terminal of the first resistor and the first terminal of the second resistor, and the second input terminal of the amplifier is provided with the common electrode input signal and the amplifier is configured to output the common electrode compensation signal. The first terminal of the second capacitor is coupled to the second terminal of the first capacitor, and the second terminal of the second capacitor is coupled to ground.

In an embodiment of the present disclosure, the adjustment circuit is configured to increase capacitance of the second capacitor when the common electrode compensation signal lags the common electrode feedback signal, and reduce the capacitance of the second capacitor when the common electrode compensation signal precedes the common electrode feedback signal.

In an embodiment of the present disclosure, a compensation rate of the compensation device varies for different areas of the display panel.

In an embodiment of the present disclosure, the compensation rate of the compensation device in an area where a voltage difference of the common electrode voltage has a first rate of change with respect to time is higher than the compensation rate of the compensation device in an area where the voltage difference of the common electrode voltage has a second rate of change, which is higher than the first rate of change, with respect to time, wherein the voltage difference is the voltage between the common electrode input signal and the common electrode compensation signal.

A second aspect of the present disclosure provides a display device including a display panel, a compensation device according to the first aspect of the present disclosure, a plurality of common electrode input lines through which a common electrode input signal is provided to the display panel, a plurality of common electrode feedback lines through which common electrode feedback signals from the display panel are provided to the compensation devices, and a plurality of common electrode compensating lines through which common electrode compensation signals are provided from the compensation devices to the display panel.

In an embodiment of the present disclosure, an active area of the display panel includes a plurality of sub-areas, wherein the compensation device is provided respectively for the respective sub-areas, and the compensation rate of each of the compensation devices is set based on a position of the corresponding sub-area in the display panel.

In an embodiment of the present disclosure, the compensation rates of the compensation devices provided for the sub-areas having the same distance from the central axis of the display panel are equal.

In an embodiment of the present disclosure, the display panel includes at least one capacitor arranged in an area other than an active area of the display panel, such that the common electrode voltage of the display panel remains stable.

In an embodiment of the present disclosure, the capacitor may include a first metal layer coupled to a common electrode input terminal of the display panel, an insulating layer on the first metal layer, and a second metal layer on the insulating layer and having a ground terminal.

In an embodiment of the present disclosure, the capacitor may include a first metal layer coupled to a common electrode input terminal of the display panel, a first insulating layer on the first metal layer, a second insulating layer on the first insulating layer, and a third metal layer on the second insulating layer and having a ground terminal.

In an embodiment of the present disclosure, the capacitor may include a first metal layer, a first insulating layer on the first metal layer, a second metal layer on the first insulating layer and coupled to a common electrode input terminal of the display panel, a second insulating layer on the second metal layer, and a third metal layer on the second insulating layer. The first metal layer and/or the third metal layer have/has a ground terminal.

In an embodiment of the present disclosure, the capacitor may include a first metal layer having a ground terminal, a first insulating layer on the first metal layer, a second insulating layer on the first insulating layer, and a third metal layer on the second insulating layer and coupled to the common electrode input terminal of the display panel.

In an embodiment of the present disclosure, the display device further includes a PCB. A capacitor is arranged on the PCB.

In an embodiment of the present disclosure, a terminal of the capacitor is coupled to the common electrode input signal, and another terminal of the capacitor is grounded, such that the common electrode voltage of the display panel remains stable.

A third aspect of the present disclosure provides method for compensating a common electrode voltage in an above-mentioned display device. In this method, a common electrode input signal inputted to a display panel of the display device and a common electrode feedback signal from the display panel are obtained, wherein the common electrode input signal provides a common electrode voltage. A common electrode compensation signal is generated based on the common electrode feedback signal and the common electrode input signal. Then, the common electrode compensation signal is compared with the common electrode feedback signal, and the common electrode compensation signal is adjusted based on the comparison result.

In an embodiment of the present disclosure, an active area of the display panel may include a plurality of sub-areas, and the common electrode compensation signal is generated for each of the plurality of sub-areas.

BRIEF DESCRIPTION OF THE DRAWINGS

In order to illustrate the technical solutions of the present disclosure more clearly, the drawings accompanying the embodiments are briefly described below. It should be appreciated that the drawings described below merely relate to some of the embodiments of the present disclosure, rather than limiting the present disclosure.

DETAILED DESCRIPTION

In order to make the technical solutions and advantages of the embodiments of the present disclosure clearer, the technical solutions of the embodiments of the present disclosure will be clearly and completely described below in conjunction with the accompanying drawings. Apparently, the described embodiments are merely part of the embodiments of the present disclosure, instead of all of the embodiments. Based on the described embodiments, all other embodiments obtained by those of ordinary skills in the art without creative work also fall within the scope of protection of the present disclosure.

A common electrode shift (VCOM Shift), i.e. a change in VCOM voltage, will affect the actual voltage applied to a pixel, thereby potentially causing residual image. As display resolution increases and display quality requirements increase, VCOM voltage compensation is often required to improve VCOM voltage stability.

However, in the existing VCOM voltage compensation technology, capacity of tolerance of the VCOM shift is not considered. Moreover, it is difficult to adjust the VCOM compensation in a controlled manner. Although the compensation can be performed using an active VCOM voltage input through a timing controller (TCON) or the like, the power integrated circuit (Power IC) is complex in structure and costly. In addition, the compensation effect is generally poor in an area where the variation of the VCOM voltage difference is small.

Figure 1A:
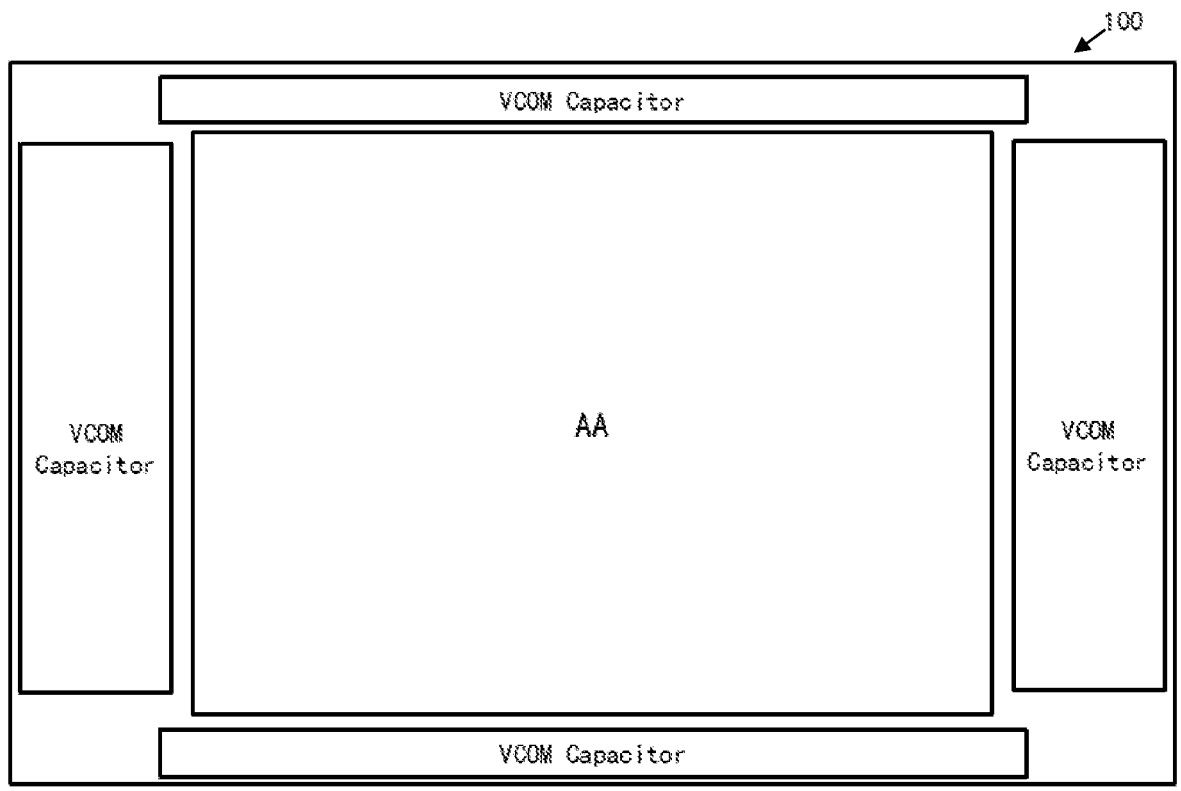
FIG. 1A is a schematic diagram of a display panel according to an embodiment of the present disclosure.

FIG. 1A shows a schematic diagram of a display panel 100 according to an embodiment of the present disclosure. An active area (AA) is provided in the center of the display panel 100, and a plurality of VCOM capacitors are provided respectively in an area other than the active area AA of the display panel, that is, at an edge of Fan Out area of the display panel.

Figure 1B:
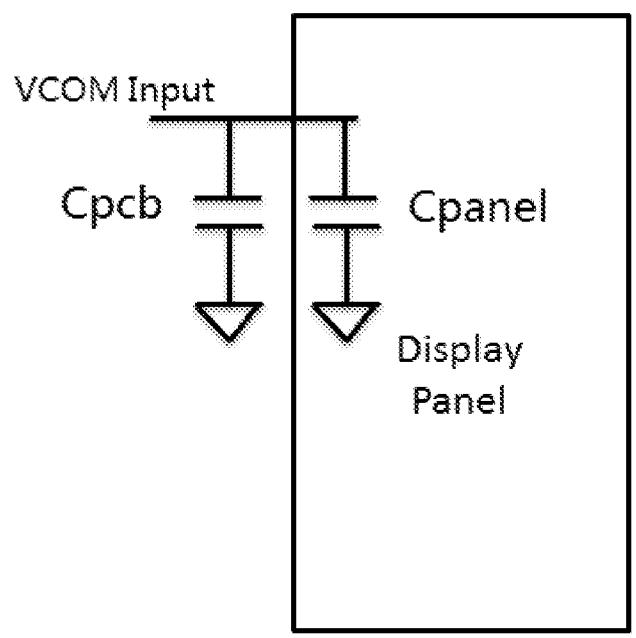
FIG. 1B is a schematic block diagram of the display panel as shown in FIG. 1A.

Referring also to FIG. 1B which is equivalent to a schematic block diagram of the display panel as shown in FIG. 1A, the capacitor Cpanel is equivalent to the VCOM capacitor in FIG. 1A, with one terminal coupled to the VCOM input terminal and the other terminal grounded. In addition, the capacitor Cpcb is schematically shown as a capacitor on a printed circuit board (PCB) outside the display panel, similarly, with one terminal coupled to the VCOM input terminal and the other terminal grounded. The capacitors Cpanel and Cpcb are both configured to filter the VCOM input signal provided to the display panel, thereby enhancing the stability of the VCOM voltage.

If only the capacitor Cpcb is used to filter the VCOM input signal, since the capacitor Cpcb is relatively far away from the display panel, the line therebetween will create losses, thereby affecting the filtering effect. On the other hand, the capacitor Cpanel (i.e. the VCOM capacitor) arranged on the display panel is relatively close to the active area AA of the display panel, thereby reducing the generated line loss during filtering the VCOM input signal, and achieving a better filtering effect. In this way, the load capacity and shift resistance of the common electrode inside the display panel can be improved, thereby remarkably improving the stability of the VCOM voltage.

Further, the VCOM capacitor described above can be constructed without changing the existing TFT manufacturing process. Specifically, during manufacturing the array substrate, a VCOM capacitor as described above can be constructed by using existing metal layers and insulating layers in the display panel in a vacant area at an edge of a fan-out area of the display panel. Since the active area is coated with sealant around, the VCOM capacitor may be configured in a variety of structures, such as full coverage or mesh shape, wherein the mesh structure and the like can enhance the sealant curing ability.

FIGS. 2A-2D show schematic cross-sectional views of four examples of the VCOM capacitor as shown in FIG. 1A, which respectively use the configuration of 2 metal layers/3 metal layers, as described in detail below.

Figure 2A:
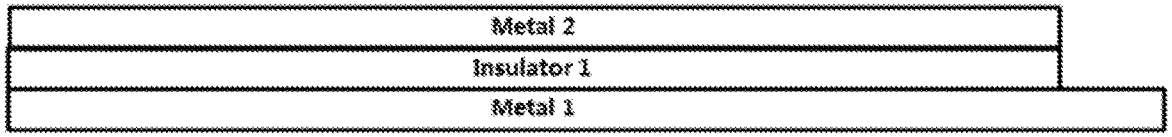
FIG. 2A is a schematic cross-sectional view of a first example of a capacitor of the display panel as shown in FIG. 1A.

As shown in FIG. 2A, the VCOM capacitor includes a first metal layer (Metal 1), a first insulating layer (Insulator 1) provided on the first metal layer, and a second metal layer (Metal 2) provided on the first insulating layer. In an embodiment of the present disclosure, the first metal layer is coupled to the VCOM input terminal, and the second metal layer has a ground terminal GND.

Figure 2B:
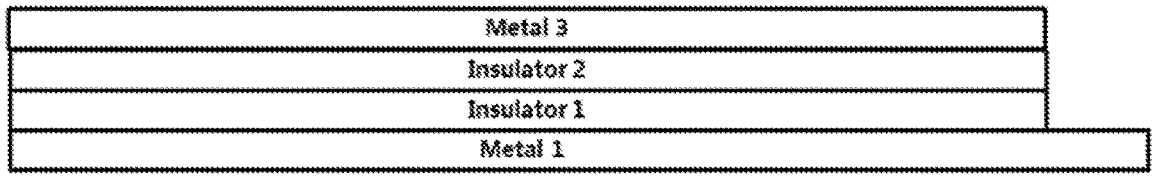
FIG. 2B is a schematic cross-sectional view of a second example of the capacitor of the display panel as shown in FIG. 1A.

As shown in FIG. 2B, the VCOM capacitor includes a first metal layer (Metal 1), a first insulating layer (Insulator 1) provided on the first metal layer, a second insulating layer (Insulator 2) provided on the first insulating layer, and a third metal layer (Metal 3) provided on the second insulating layer. In an embodiment of the present disclosure, the first metal layer is coupled to the VCOM input terminal, and the second metal layer has a ground terminal GND.

Figure 2C:
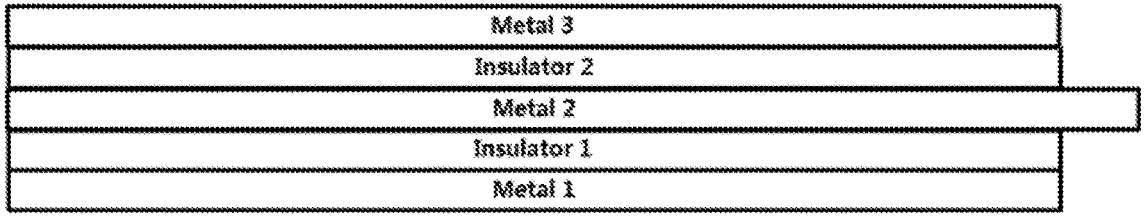
FIG. 2C is a schematic cross-sectional view of a third example of the capacitor of the display panel as shown in FIG. 1A.

As shown in FIG. 2C, the VCOM capacitor includes a first metal layer (Metal 1), a first insulating layer (Insulator 1) provided on the first metal layer, a second metal layer (Metal 2) provided on the first insulating layer, a second insulating layer (Insulator 2) provided on the second metal layer, and a third metal layer (Metal 3) provided on the second insulating layer. In an embodiment of the present disclosure, the second metal layer is coupled to the VCOM input terminal, and the first metal layer and/or the third metal layer have/has a ground terminal GND.

Figure 2D:
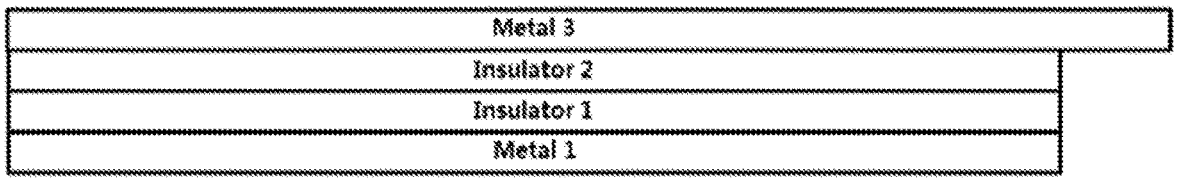
FIG. 2D is a schematic cross-sectional view of a fourth example of the capacitor of the display panel as shown in FIG. 1A.

As shown in FIG. 2D, the VCOM capacitor includes a first metal layer (Metal 1), a first insulating layer (Insulator 1) provided on the first metal layer, a second insulating layer (Insulator 2) provided on the first insulating layer, and a third metal layer (Metal 3) provided on the second insulating layer. In an embodiment of the present disclosure, the third metal layer is coupled to the VCOM input terminal, and the first metal layer has a ground terminal GND.

Further, for a gate switching element, such as a field-effect transistor (MOSFET), on a display panel, a gate thereof may be constructed on the first metal layer, and a source/drain thereof may be formed on the second metal layer. In an embodiment of the present disclosure, the first metal layer, the second metal layer, and the third metal layer are made of a metal material such as molybdenum, aluminum, aluminum-nickel alloy, nickel-tungsten alloy, copper, etc. The first insulating layer and the second insulating layer are made of an insulating material such as silicon nitride, a mixture of silicon nitride and silicon oxynitride, or the like.

As mentioned above, the VCOM capacitor is constructed using existing manufacturing process, with simple structure and easy to manufacture.

In an embodiment of the present disclosure, a VCOM voltage is inputted to the display panel. A VCOM signal inside the display panel is led out to a VCOM feedback point by providing a sampling point, to obtain a VCOM feedback signal. The VCOM feedback signal is amplified by an amplifier and then passes through a VCOM compensation circuit to obtain a VCOM compensation signal. The VCOM compensation signal is inputted into the display panel to compensate for the change of the VCOM voltage inside the display panel.

Figure 3:
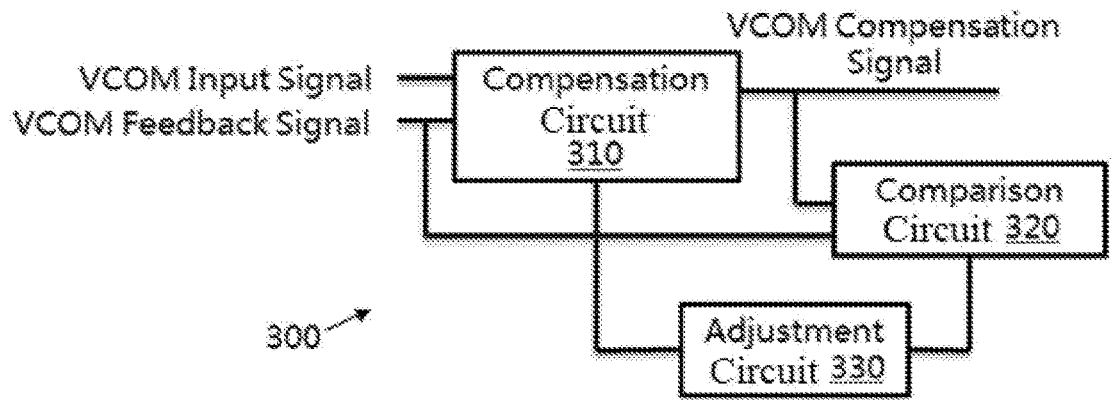
FIG. 3 is a schematic block diagram of a compensation device according to an embodiment of the disclosure.

FIG. 3 shows a schematic block diagram of a compensation device 300 according to an embodiment of the disclosure. As shown in FIG. 3, the compensation device 300 may include a compensation circuit 310, a comparison circuit 320, and an adjustment circuit 330. The compensation circuit 310 may generate a VCOM compensation signal to be provided to the display panel under the control of a VCOM input signal and a VCOM feedback signal. The comparison circuit 320 is configured to compare the phases between the VCOM compensation signal and the VCOM feedback signal. The adjustment circuit 330 is configured to adjust the compensation circuit 310 to adjust the VCOM compensation signal according to the comparison result so as to reduce the phase difference therebetween.

In an embodiment of the present disclosure, the compensation circuit 310, the comparison circuit 320, and the adjustment circuit 330 may be implemented as a combination of a processor and a memory, where the processor performs a program stored in the memory to implement the functions of the corresponding circuits. The circuits described herein may also be implemented in hardware, including application specific integrated circuits (ASICs), field programmable gate arrays (FPGA), etc., or in a combination of hardware and software.

Figure 4A:
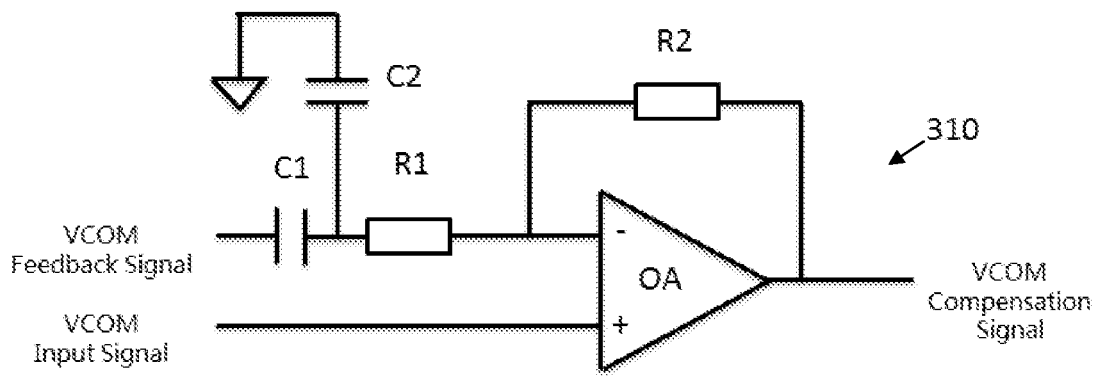
FIG. 4A is an exemplary circuit diagram of the compensation circuit in the compensation device shown in FIG. 3.

FIG. 4A shows an exemplary circuit diagram of the compensation circuit 310 in the compensation device 300 shown in FIG. 3. The compensation circuit 310 may include a first capacitor C1, a first resistor R1, a second resistor R2, an amplifier OA, and a second capacitor C2. The first terminal of the first capacitor C1 is provided with a VCOM feedback signal, and the second terminal of the first capacitor C1 is coupled to the first terminal of the first resistor R1, such that the first capacitor C1 is configured to isolate DC noise. The first terminal of the first resistor R1 is coupled to the second terminal of the first capacitor C1, and the second terminal of the first resistor R1 is coupled to the first input terminal of the amplifier OA. The first terminal of the second resistor R2 is coupled to the first input terminal of the amplifier OA, and the second terminal of the second resistor R2 is coupled to the output terminal of the amplifier OA. The first input terminal of the amplifier OA is coupled to the second terminal of the first resistor R1, the second input terminal of the amplifier OA is provided with a VCOM input signal, and the output terminal of the amplifier OA outputs a first VCOM compensation signal. The first terminal of the second capacitor C2 is coupled to the second terminal of the first capacitor C1, and the second terminal of the second capacitor C2 is grounded. The first input terminal of the amplifier OA may be an inverting input terminal, and the second input terminal may be a non-inverting input terminal.

Figure 4B:
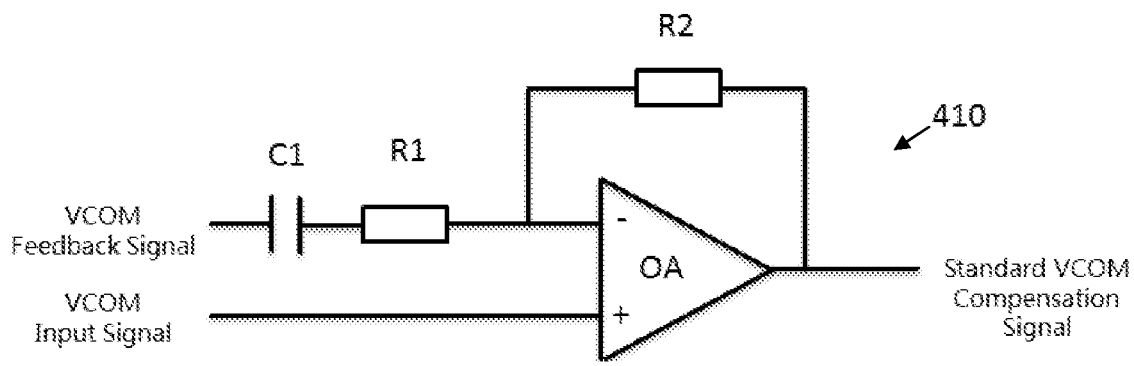
FIG. 4B is a compensation circuit diagram for illustrating a compensation circuit in an ideal situation.

FIG. 4B shows a compensation circuit diagram for explaining a standard compensation circuit 410 in an ideal situation. The standard compensation circuit 410 can generate a standard VCOM compensation signal under the control of the VCOM input signal and the VCOM feedback signal. Its basic structure is the same as that of the compensation circuit 310 in FIG. 4A, except that the standard compensation circuit 410 does not have the second capacitor C2, and the rest will not be described in detail. By calculation, the ideal parameters of each of the abovementioned elements can be obtained separately, and thus the elements of the compensation circuit 310 in FIG. 4A can be configured correspondingly using the calculated parameters. The capacitances of the first capacitors C1 of the two compensation circuits may or may not be the same.

Generally, the compensation device is configured to generate a VCOM compensation signal that compensate for a shift of the VCOM feedback signal, thereby improving the stability of the VCOM voltage. Ideally, the VCOM compensation signal and the VCOM feedback signal have the same magnitude, opposite direction and same phase, i.e. there is no delay between them. However, in reality, due to the manufacturing process and line loss, there is usually a phase difference between the VCOM feedback signal and the VCOM compensation signal, that is, the time delay, which will affect the compensation effect.

Figure 5:
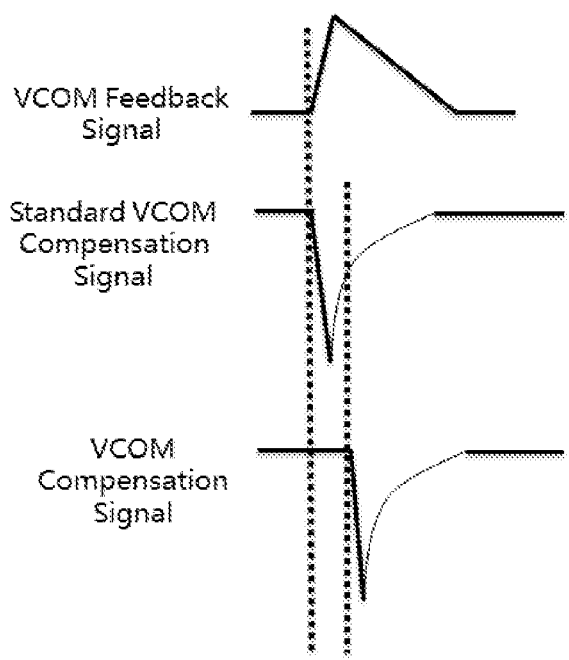
FIG. 5 is a schematic diagram for explaining the relationship between a VCOM compensation signal and a VCOM feedback signal of the compensation circuit shown in FIGS. 4A and 4B.

The compensation device 300 shown in FIG. 3 will be described in detail in combination with FIG. 4A, FIG. 4B, and FIG. 5. As described above, the standard VCOM compensation signal (see FIG. 5) generated by the standard compensation circuit 410 can be assumed to be a VCOM compensation signal in the ideal state, which has the same phase as the VCOM feedback signal, i.e. without time delay. On the other hand, there is usually a delay between the VCOM compensation signal generated by the compensation circuit 310 (see FIG. 5) and the VCOM feedback signal. In other words, there is a phase difference between the VCOM compensation signal and the standard VCOM compensation signal.

The phases of both the VCOM compensation signal and the VCOM feedback signal are observed and compared by a comparison circuit 320, such as an oscilloscope. The VCOM compensation signal is adjusted by the adjustment circuit 330 or manually adjusting the capacitance of the second capacitor C2 in the compensation circuit 310 in real time, so as to reduce the phase difference therebetween. In other words, the VCOM compensation signal with delay is adjusted to the assumed ideal standard VCOM compensation signal. Specifically, when the VCOM compensation signal lags the VCOM feedback signal, the capacitance of the second capacitor C2 is increased to shorten the delay. When the VCOM compensation signal precedes the VCOM feedback signal, the capacitance of the second capacitor C2 is reduced, so as to increase the delay. Therefore, the adjusted VCOM compensation signal approximates the standard VCOM compensation signal. When the adjusted VCOM compensation signal is inputted to the display panel, it can reversely compensate for the VCOM voltage more effectively and speed up the compensation and improve the compensation effect.

In addition, the magnification of the amplifier OA in the compensation circuit 310 may also be configured as the compensation rate of the compensation device 300. In an embodiment of the present disclosure, the compensation rate of the compensation device 300 may vary for different areas of the display panel. Specifically, the compensation rate of the compensation device in an area where the voltage difference of the VCOM voltage has a low rate of change (which can be referred as the first rate of change) with respect to time (i.e. the recovery rate of the VCOM shift) is higher than the compensation rate of the compensation device in an area where the voltage difference of the VCOM voltage has a high rate of change (which can be referred as the second rate of change) with respect to time. The second rate of change is higher than the first rate of change. The voltage difference is the voltage between the common electrode input signal and the common electrode compensation signal.

In addition, the magnification of the amplifier OA may be adjusted, so that the amplitude of the compensation signal can also be corrected, thereby improving the compensation effect. Specifically, increasing the magnification of the amplifier OA increases the amplitude of the compensation signal, while reducing the magnification of the amplifier OA reduces the amplitude of the compensation signal.

Figure 6:
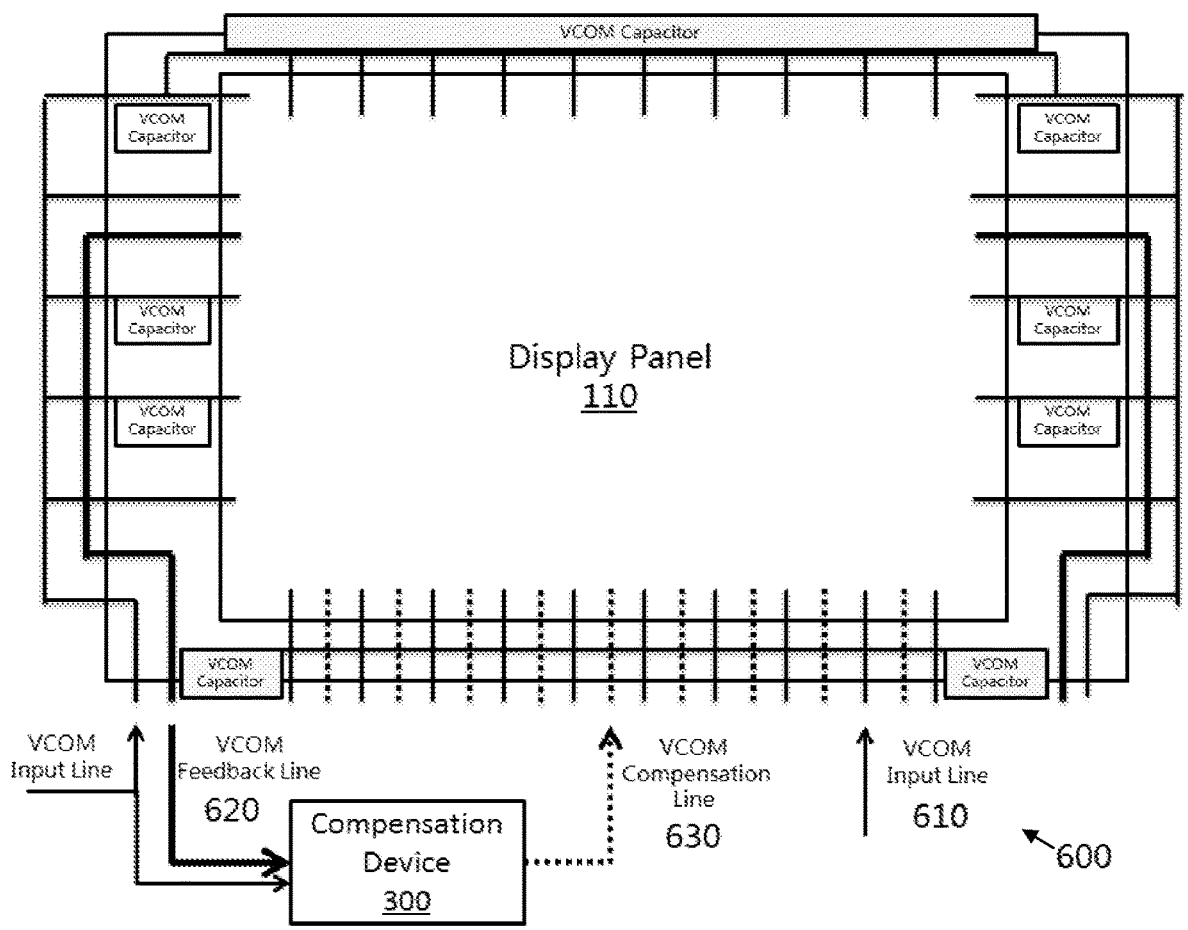
FIG. 6 is a schematic diagram of a display device according to an embodiment of the present disclosure.

FIG. 6 shows a schematic diagram of a display device 600 according to an embodiment of the present disclosure. As shown in FIG. 6, the display device 600 includes a display panel 110 (similar to the display panel 100 as described above, except changes in position and number of the VCOM capacitors), a compensation device 300 as described above, a plurality of VCOM input lines 610 (shown by thin solid lines), a plurality of VCOM feedback lines 620 (shown by heavy solid lines), and a plurality of VCOM compensation lines 630 (shown by dashed lines).

In an embodiment of the present disclosure, each VCOM input line 610 is coupled to a VCOM input point on the display panel 110. The VCOM input signal, i.e. a VCOM voltage, is provided through the VCOM input line 610 to the display panel 110, so as to provide reference voltage to each pixel of the display panel 110. In addition, the VCOM input line 610 is also coupled to an input terminal of the compensation device 300, such that the VCOM input signal is provided to the compensation device 300.

A plurality of sampling points are provided on the display panel 110, for example, at the center of an active area AA of the display panel, at the proximal or distal end relative to the active area AA. The VCOM feedback signal at the sampling point is transmitted to another input terminal of the compensation device 300 through the VCOM feedback line 620.

One terminal of each VCOM compensation line 630 is coupled to the output terminal of the compensation device 300, and the other terminal thereof is coupled to a VCOM compensation point (on the VCOM BAR) on the display panel 110 where the compensation is needed. The VCOM compensation line 630 is a dedicated thick line for VCOM with a low line loss. Therefore, the VCOM compensation signal from the compensation device 300 may be inputted to the display panel 110, thereby reversely compensating each VCOM compensation point, i.e. compensating for a shift similar to the VCOM feedback signal.

The display device 600 as described above may be configured to improve the shift resistance of the VCOM voltage, and control the VCOM voltage compensation in an adjustable manner. As a result, the stability of the VCOM voltage can be increased and the VCOM voltage compensation can be accelerated.

On the other hand, it can be found through observation that the VCOM voltage difference in different areas has different rates of change with respect to time for a display panel, that is, the recovery rate of the VCOM shift is different. Specifically, the recovery rate near the periphery of the display panel is high, and the recovery rate near the center is low. Therefore, the VCOM voltage compensation effect will be affected.

In an embodiment of the present disclosure, the display device may further include a PCB, wherein a capacitor is arranged on the PCB. In an example, a terminal of the capacitor is coupled to the common electrode input signal, and another terminal of the capacitor is grounded, such that the common electrode voltage of the display panel remains stable.

Figure 7:
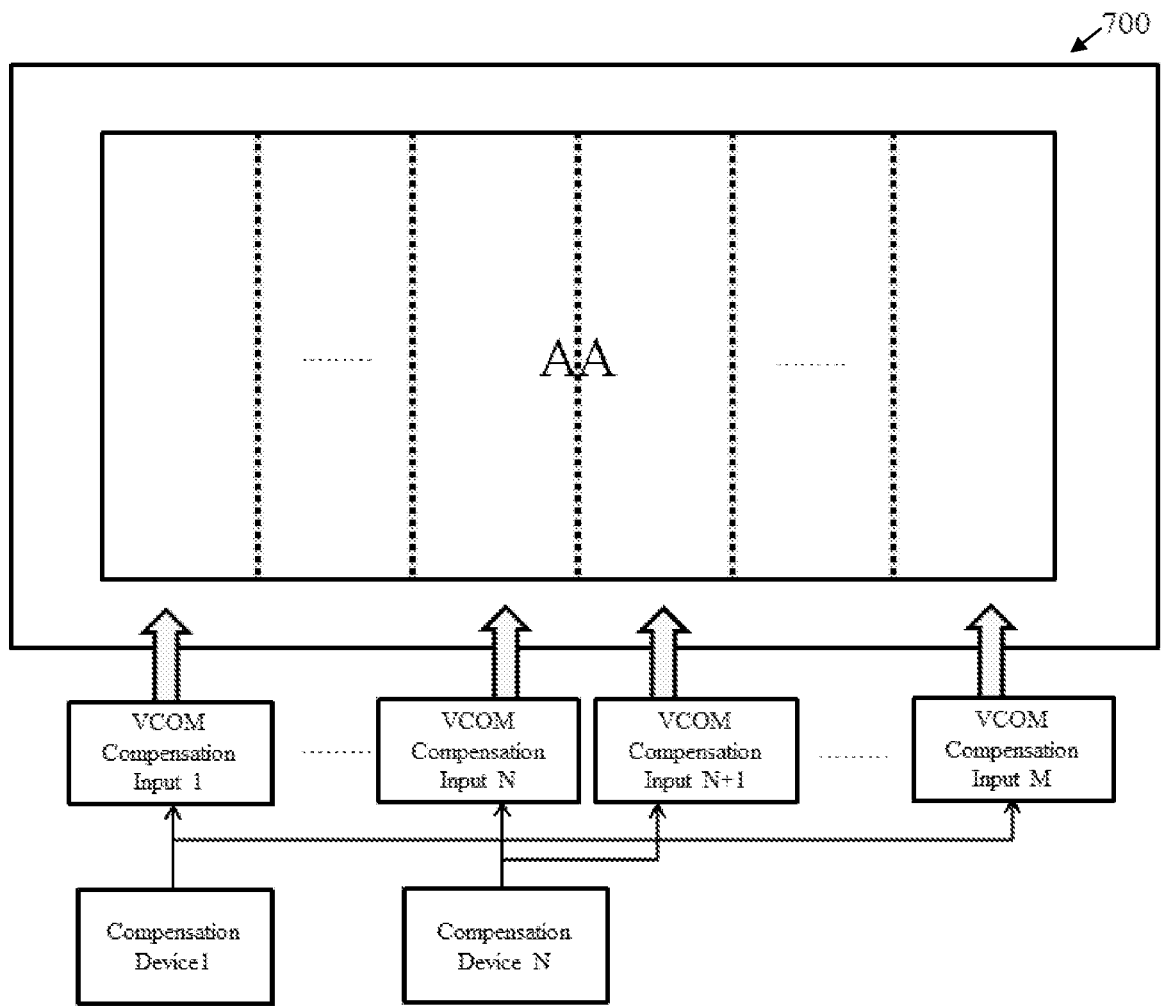
FIG. 7 is a schematic diagram of a display device according to another embodiment of the present disclosure.

FIG. 7 shows a schematic diagram of a display device 700 using a method for compensating the VCOM voltages based on different areas according to another embodiment of the present disclosure. In an embodiment of the present disclosure, an active area AA of the display panel includes M sub-areas. A corresponding reverse VCOM voltage compensation is performed on each sub-area.

Specifically, the compensation device 300 as described above is configured for each subarea respectively. The VCOM voltage of each subarea is detected by a device such as an oscilloscope to obtain the recovery rate of the VCOM shift of each subarea. The VCOM feedback signal and the VCOM input signal are respectively inputted to the input terminals of the corresponding compensation devices 300. For example, the gain of the amplifier OA in each compensation device 300 is adjusted by adjusting peripheral circuits. The gain of the amplifier OA can be regarded as the compensation rate of the compensation device. That is, a different compensation rate is configured for the corresponding compensation device 300 in each sub-area to effectively control the recovery rate of the VCOM shift. Specifically, increasing the gain of the amplifier OA, that is, increasing the compensation rate of the compensation device, will increase the recovery rate of the VCOM shift, reducing the gain of the amplifier OA, i.e. reducing the compensation rate of the compensation device, will reduce the recovery rate of the VCOM shift. On the other hand, by adjusting the capacitance of the second capacitor C2 in the corresponding compensation device 300 in each subarea, the delay of each VCOM compensation signal with respect to the VCOM feedback signal is reduced, so that the sub-areas are reversely compensated more effectively. According to the above description, the VCOM compensation signals of the sub-areas of the display panel reversely compensate the corresponding sub-areas respectively. Therefore, different compensation rates and different compensation delays are employed with respect to the edges and the center to obtain better compensation effects.

In an embodiment of the present disclosure, the active area of the display panel is provided with M sub-areas axially symmetrical on both the left and right sides with the center thereof as an axis. Specifically, the display panel active area includes a plurality of sub-areas such as a first sub-area, an $N^{th}$ sub-area, an $M^{th}$ sub-area, and the like. M and N are natural numbers, and M=2N. Therefore, the compensation devices may be provided as the same for the first sub-area and the $M^{th}$ sub-area, the compensation devices may be provided as the same for the second sub-area and the $M-1^{th}$ sub-area, and the compensation devices may be provided as the same for the $N^{th}$ sub-area and the $N+1^{th}$ sub-area. Other settings are similar, and will not be repeated. Therefore, 1 to N kinds of different compensation devices may be provided, to obtain 1 to N kinds of different VCOM compensation signals, in order to achieve better compensation effects.

Figure 8:
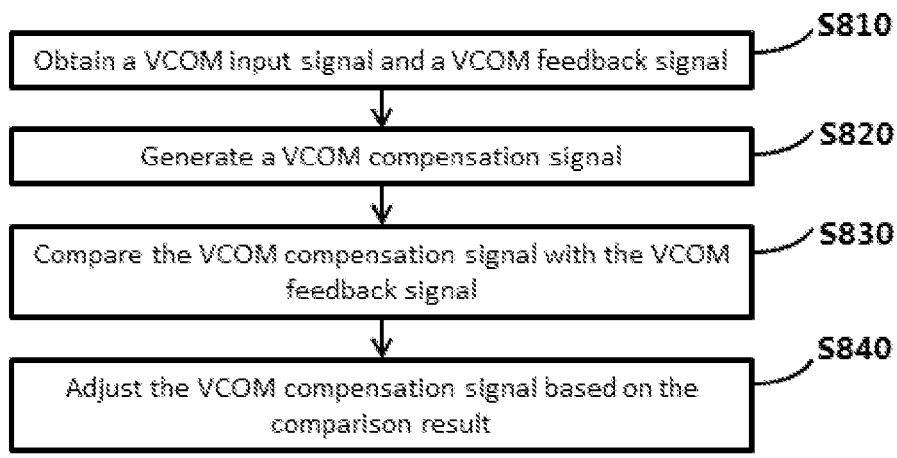
FIG. 8 is a flowchart of a method for compensating the common electrode voltage according to an embodiment of the present disclosure.

FIG. 8 shows a flowchart of a VCOM voltage compensation method according to an embodiment of the present disclosure. In step S810, the compensation circuit obtains a VCOM input signal inputted to the display panel of the display device by using the VCOM input line, and obtains a VCOM feedback signal from a sampling point of the display panel by using the VCOM feedback line, wherein the VCOM input signal provides a common electrode voltage, while the sampling point may be a central sampling point, a near-end sampling point or a far-end sampling point. In step S820, the compensation circuit generates a VCOM compensation signal according to the VCOM feedback signal and the VCOM input signal, and provides the VCOM compensation signal to a VCOM compensation point that needs compensation in the display panel, through a dedicated thick line for VCOM compensation. Therefore, a shift similar to the VCOM feedback signal is compensated. In step S830, the phases of the VCOM compensation signal and the VCOM feedback signal are compared using the comparison circuit described above. In step S840, based on the comparison result, the VCOM compensation signal is adjusted by the adjustment circuit such that the VCOM compensation signal have the same phase as the VCOM feedback signal. In this way, it improves the effect of reversely compensating the display panel.

In an embodiment of the present disclosure, the VCOM voltage compensation method further includes identifying an active area of the display panel with a plurality of sub-areas and generating a corresponding VCOM compensation signal for each sub-area of the plurality of sub-areas.

FIGS. 9A-9D each shows a flow chart of a process for manufacturing a VCOM capacitor as shown in FIGS. 2A-2D. The VCOM capacitors are constructed by using the existing metal layers and insulating layers at the edges of the fan-out area of the display panel, which are described in detail as follows.

Figure 9A:
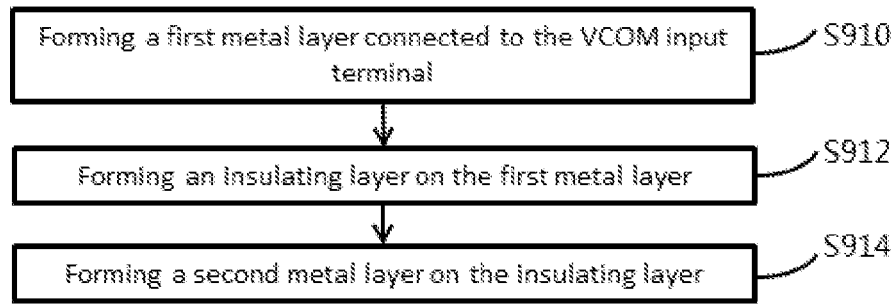
FIG. 9A is a flow chart of a process for manufacturing the capacitor shown in FIG. 2A.

As shown in FIG. 9A, in step S910, a first metal layer is formed and coupled to the VCOM input terminal. In step S912, an insulating layer is formed on the first metal layer. In step S914, a second metal layer is formed on the insulating layer, wherein a ground terminal GND is formed on the second metal layer.

Figure 9B:
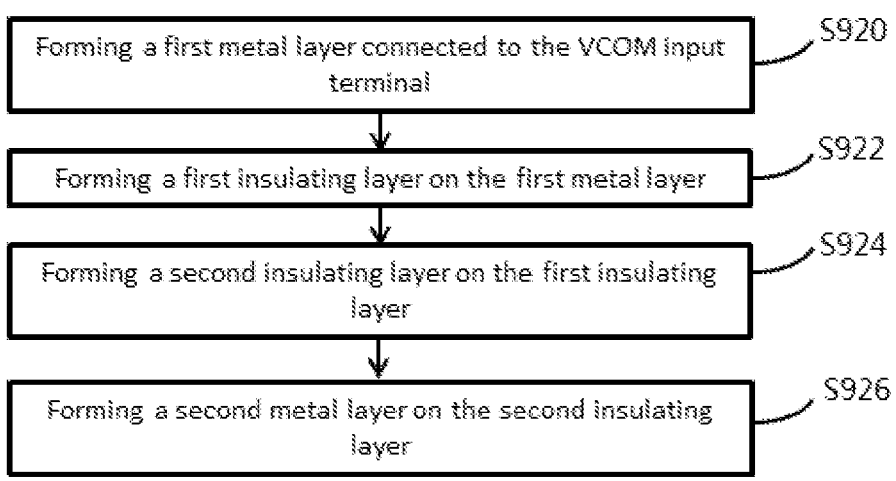
FIG. 9B is a flow chart of a process for manufacturing the capacitor shown in FIG. 2B.

As shown in FIG. 9B, a first metal layer is formed and coupled to the VCOM input at step S920. At step S922, a first insulating layer is formed on the first metal layer. In step S924, a second insulating layer is formed on the first insulating layer. In step S926, a second metal layer is formed on the second insulating layer, wherein a ground terminal GND is formed on the second metal layer.

Figure 9C:
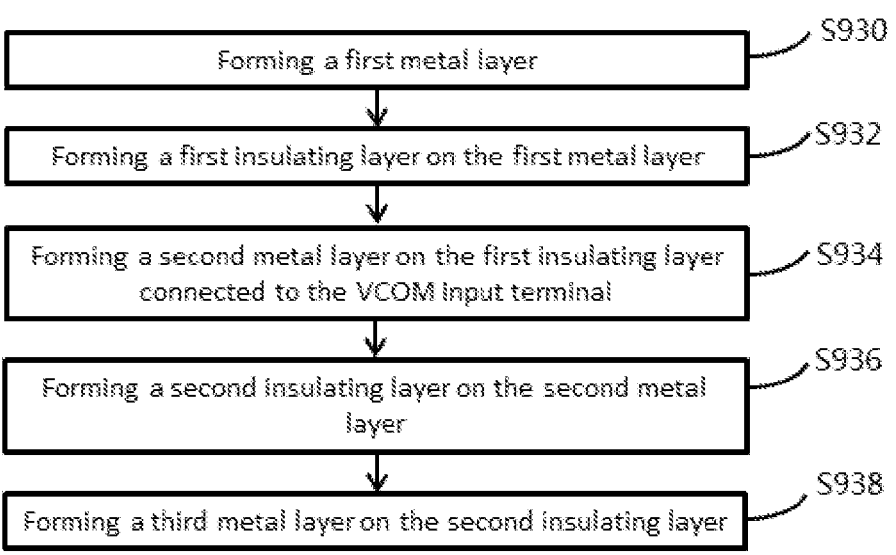
FIG. 9C is a flow chart of a process for manufacturing the capacitor shown in FIG. 2C.

As shown in FIG. 9C, in step S930, a first metal layer is formed. In step S932, a first insulating layer is formed on the first metal layer. In step S934, a second metal layer is formed on the first insulating layer, and coupled to the VCOM input terminal. In step S936, a second insulating layer is formed on the second metal layer. In step S938, a third metal layer is formed on the second insulating layer. A ground terminal GND is formed on the second metal layer and/or the third metal layer.

Figure 9D:
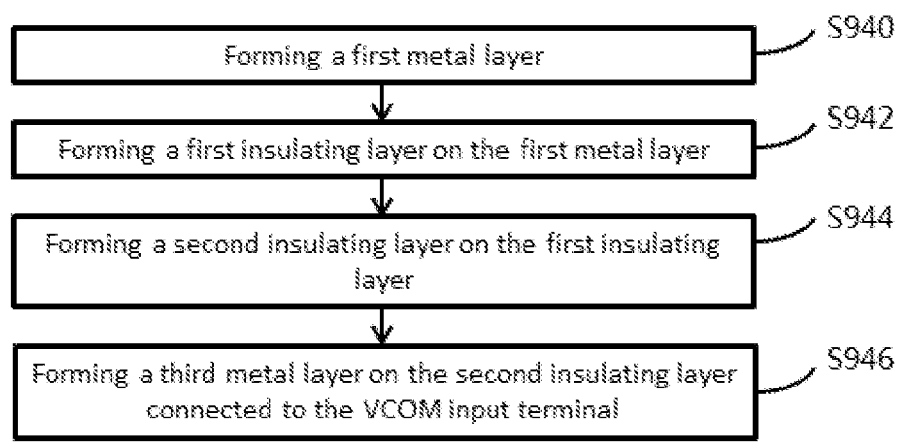
FIG. 9D is a flowchart of a process for manufacturing the capacitor shown in FIG. 2D.

As shown in FIG. 9D, in step S940, a first metal layer is formed, wherein a ground terminal GND is formed thereon. In step S942, a first insulating layer is formed on the first metal layer. In step S944, a second insulating layer is formed on the first insulating layer. A third metal layer is formed in step S946 and coupled to the VCOM input terminal.

Several embodiments of the present disclosure have been described above in detail, but the protection scope of the present disclosure is not limited thereto. It will be apparent to those of ordinary skills in the art that various modifications, substitutions, and variations can be made to the embodiments of the present disclosure without departing from the spirit or scope of the disclosure. The scope of the disclosure is defined by the following claims.

What is claimed is:

1. A compensation device for a display panel, the compensation device comprising:
a compensation circuit configured to generate a common electrode compensation signal to be provided to the display panel, based on a common electrode input signal for providing a common electrode voltage to the display panel and a common electrode feedback signal from the display panel;
a comparison circuit configured to compare the common electrode compensation signal with the common electrode feedback signal; and
an adjustment circuit configured to adjust the common electrode compensation signal according to the comparison result of the comparison circuit.

2. The compensation device according to claim 1, wherein the compensation circuit comprises a first capacitor, a first resistor, a second resistor, an amplifier, and a second capacitor;
wherein a first terminal of the first capacitor is provided with the common electrode feedback signal, and a second terminal of the first capacitor is coupled to the first resistor;
wherein a first terminal of the first resistor is coupled to the second terminal of the first capacitor, and a second terminal of the first resistor is coupled to a first input terminal of the amplifier;
wherein a first terminal of the second resistor is coupled to the first input terminal of the amplifier, and a second terminal of the second resistor is coupled to an output terminal of the amplifier;
wherein the first input terminal of the amplifier is coupled to the second terminal of the first resistor and the first terminal of the second resistor, the second input terminal of the amplifier is provided with the common electrode input signal, and the amplifier is configured to output the common electrode compensation signal; and
wherein the first terminal of the second capacitor is coupled to the second terminal of the first capacitor, and the second terminal of the second capacitor is coupled to ground.

3. The compensation device according to claim 2, wherein the adjustment circuit is configured to increase capacitance of the second capacitor when the common electrode compensation signal lags the common electrode feedback signal, and reduce the capacitance of the second capacitor when the common electrode compensation signal precedes the common electrode feedback signal.

4. The compensation device according to claim 1, wherein a compensation rate of the compensation device varies for different areas of the display panel.

5. The compensation device according to claim 4, wherein the compensation rate of the compensation device in an area where a voltage difference of the common electrode voltage has a first rate of change with respect to time is higher than the compensation rate of the compensation device in an area where the voltage difference of the common electrode voltage has a second rate of change that is higher than the first rate of change, with respect to time, wherein the voltage difference is the voltage between the common electrode input signal and the common electrode compensation signal.

6. A display device comprising:
a display panel;
a compensation device according to claim 1;
a plurality of common electrode input lines through which the common electrode input signal is provided to the display panel;
a plurality of common electrode feedback lines through which common electrode feedback signals from the display panel are provided to a plurality of compensation devices including the compensation device; and
a plurality of common electrode compensating lines through which common electrode compensation signals are provided from the plurality of compensation devices to the display panel.

7. The display device according to claim 6, wherein an active area of the display panel comprises a plurality of sub-areas, wherein each of the plurality of compensation devices is provided respectively for the respective sub-areas, and the compensation rate of each of the plurality of compensation devices is set based on a position of the corresponding sub-area in the display panel.

8. The display device according to claim 7, wherein the compensation rates of the plurality of compensation devices provided for the sub-areas having the same distance from the central axis of the display panel are equal.

9. A method for compensating a common electrode voltage in a display device according to claim 6, comprising:
obtaining a common electrode input signal inputted to the display panel of the display device and a common electrode feedback signal from the display panel;
generating a common electrode compensation signal based on the common electrode feedback signal and the common electrode input signal;
comparing the common electrode compensation signal and the common electrode feedback signal, and
adjusting the common electrode compensation signal based on the comparison result.

10. The method according to claim 9, wherein an active area of the display panel comprises a plurality of sub-areas and the common electrode compensation signal is generated for each of the plurality of sub-areas.

11. The display device according to claim 6, wherein the compensation circuit comprises a first capacitor, a first resistor, a second resistor, an amplifier, and a second capacitor;
wherein a first terminal of the first capacitor is provided with the common electrode feedback signal, and a second terminal of the first capacitor is coupled to the first resistor;
wherein a first terminal of the first resistor is coupled to the second terminal of the first capacitor, and a second terminal of the first resistor is coupled to a first input terminal of the amplifier;
wherein a first terminal of the second resistor is coupled to the first input terminal of the amplifier, and a second terminal of the second resistor is coupled to an output terminal of the amplifier;
wherein the first input terminal of the amplifier is coupled to the second terminal of the first resistor and the first terminal of the second resistor, the second input terminal of the amplifier is provided with the common electrode input signal, and the amplifier is configured to output the common electrode compensation signal; and
wherein the first terminal of the second capacitor is coupled to the second terminal of the first capacitor, and the second terminal of the second capacitor is coupled to ground.

12. The display device according to claim 11, wherein the adjustment circuit is configured to increase capacitance of the second capacitor when the common electrode compensation signal lags the common electrode feedback signal, and reduce the capacitance of the second capacitor when the common electrode compensation signal precedes the common electrode feedback signal.

13. The display device according to claim 6, wherein a compensation rate of the compensation device varies for different areas of the display panel.

14. The display device according to claim 6, wherein the display panel comprises:
   at least one capacitor arranged in an area other than an active area of the display panel, such that the common electrode voltage of the display panel remains stable.

15. The display device according to claim 14, wherein the capacitor comprises:
   a first metal layer coupled to a common electrode input terminal of the display panel;
   an insulating layer on the first metal layer; and
   a second metal layer on the insulating layer and having a ground terminal.

16. The display device according to claim 14, wherein the capacitor comprises:
   a first metal layer coupled to a common electrode input terminal of the display panel;
   a first insulating layer on the first metal layer;
   a second insulating layer on the first insulating layer; and
   a third metal layer on the second insulating layer and having a ground terminal.

17. The display device according to claim 14, wherein the capacitor comprises:
   a first metal layer;
   a first insulating layer on the first metal layer;
   a second metal layer on the first insulating layer and coupled to a common electrode input terminal of the display panel;
   a second insulating layer on the second metal layer; and
   a third metal layer on the second insulating layer, wherein at least one of the first metal layer and the third metal layer has a ground terminal.

18. The display device according to claim 14, wherein the capacitor comprises:
   a first metal layer having a ground terminal;
   a first insulating layer on the first metal layer;
   a second insulating layer on the first insulating layer; and
   a third metal layer on the second insulating layer and coupled to a common electrode input terminal of the display panel.

19. The display device according to claim 6, further comprising:
   a PCB, wherein a capacitor is arranged on the PCB.

20. The display device according to claim 19, wherein a terminal of the capacitor is coupled to the common electrode input signal, and another terminal of the capacitor is wounded, such that the common electrode voltage of the display panel remains stable.

* * * * *

UNITED STATES PATENT AND TRADEMARK OFFICE
CERTIFICATE OF CORRECTION

PATENT NO. : 10,916,209 B2
APPLICATION NO. : 15/767391
DATED : February 9, 2021
INVENTOR(S) : Jianjun Wang et al.

It is certified that error appears in the above-identified patent and that said Letters Patent is hereby corrected as shown below:

In the Claims

In Claim 20, Column 14, Line 26, delete "wounded, such" and insert therefor -- grounded, such --.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*